United States Patent [19]

Clark

[11] Patent Number: 4,866,922
[45] Date of Patent: Sep. 19, 1989

[54] MULTIPURPOSE RAKE

[76] Inventor: Timothy D. Clark, Rte. 3, Box 173, Council Bluffs, Iowa 51503

[21] Appl. No.: 290,570

[22] Filed: Dec. 27, 1988

[51] Int. Cl.$^4$ .............................................. A01B 1/20
[52] U.S. Cl. .............................. 56/400.04; 56/400.12; 56/400.18; 56/400.19; 294/50.6
[58] Field of Search .......... 56/400.01, 400.04, 400.12, 56/400.17, 400.18, 400.19, DIG. 18; 294/50.8, 51, 52, 49, 58, 59, 50.6

[56] References Cited

U.S. PATENT DOCUMENTS

| | | | |
|---|---|---|---|
| 2,180,544 | 11/1939 | Nissen | 56/400.01 X |
| 2,546,113 | 3/1951 | Spang | 56/400.17 X |
| 2,652,279 | 9/1953 | Morris | 56/400.18 X |
| 4,477,114 | 10/1984 | Callis | 294/58 X |

*Primary Examiner*—Hoang C. Dang
*Attorney, Agent, or Firm*—Zarley, McKee, Thomte, Voorhees & Sease

[57] ABSTRACT

A multipurpose rake includes a head portion having tines along one end thereof, and an elongated handle removably connected to the other end. A hand-hold is affixed on the upper face of the rake head intermediate the tines and the handle end, and is shaped so as to be gripped by a hand. A strap is formed into an upwardly projecting loop, and affixed to the handle end of the rake head. In use, the handle may be removed, and a hand extended through the loop in the strap so as to grip the hand-hold. The strap will then be located on the forearm of the user, allowing the user to easily grasp and maneuver the rake head.

4 Claims, 3 Drawing Sheets

MULTIPURPOSE RAKE

TECHNICAL FIELD

The present invention relates generally to leaf rakes, and more particularly to leaf rakes having a removable handle.

BACKGROUND OF THE INVENTION

While leaf rakes have been marketed with a wide variety of different types of rake heads, with various types of tines, they typically have two common components—an elongated handle and a rake head. The elongated handle allows the user to stand while raking leaves and other materials, without having to bend over. The various head designs all serve the purpose of collecting leaves or the like in a plurality of tines, so as to collect the material in a single pile.

The major problem with conventional rakes occurs once the leaves or other materials have been collected into a pile. Picking up the leaves and transporting them to a trash container or the like is difficult and cumbersome utilizing rakes. The rake must be gripped on the handle closely adjacent the rake head in order to achieve the necessary leverage to lift a pile of leaves. In attempting to lift the pile, the rake head can easily rotate, rotating the handle within the hand and spilling the leaves.

Furthermore, because of the lack of leverage, it is difficult to lift and move a large amount of material.

It is therefore a general object of the present invention to provide an improved multipurpose rake.

Another object is to provide a multipurpose rake with a rake head which is easily lifted and maneuvered.

A further object of the present invention is to provide a multipurpose rake which will allow large amounts of material to be easily lifted and moved.

Yet another object is to provide a multipurpose rake which can be utilized as a material collecting and lifting tool.

These and other objects of the present invention will be apparent to those skilled in the art.

SUMMARY OF THE INVENTION

The multipurpose rake of the present invention includes a head portion having tines along one end thereof, and an elongated handle removably connected to the other end. A hand-hold is affixed on the upper face of the rake head intermediate the tines and handle end, and is shaped so as to be gripped by a hand. A strap is formed into an upwardly projecting loop, and affixed to the handle end of the rake head. In use, the rake may be utilized in a conventional fashion to collect leaves and other material into a pile. The handle may then be removed, and a hand extended through the loop in the strap so as to grip the hand-hold. The strap will then be located on the forearm of the user, allowing the user to easily grasp and maneuver the rake head. The rake head then serves as an enlarged hand to dramatically increase the amount of material which may be grasped and lifted.

DESCRIPTION OF THE PREFERRED EMBODIMENT

Figure 2:
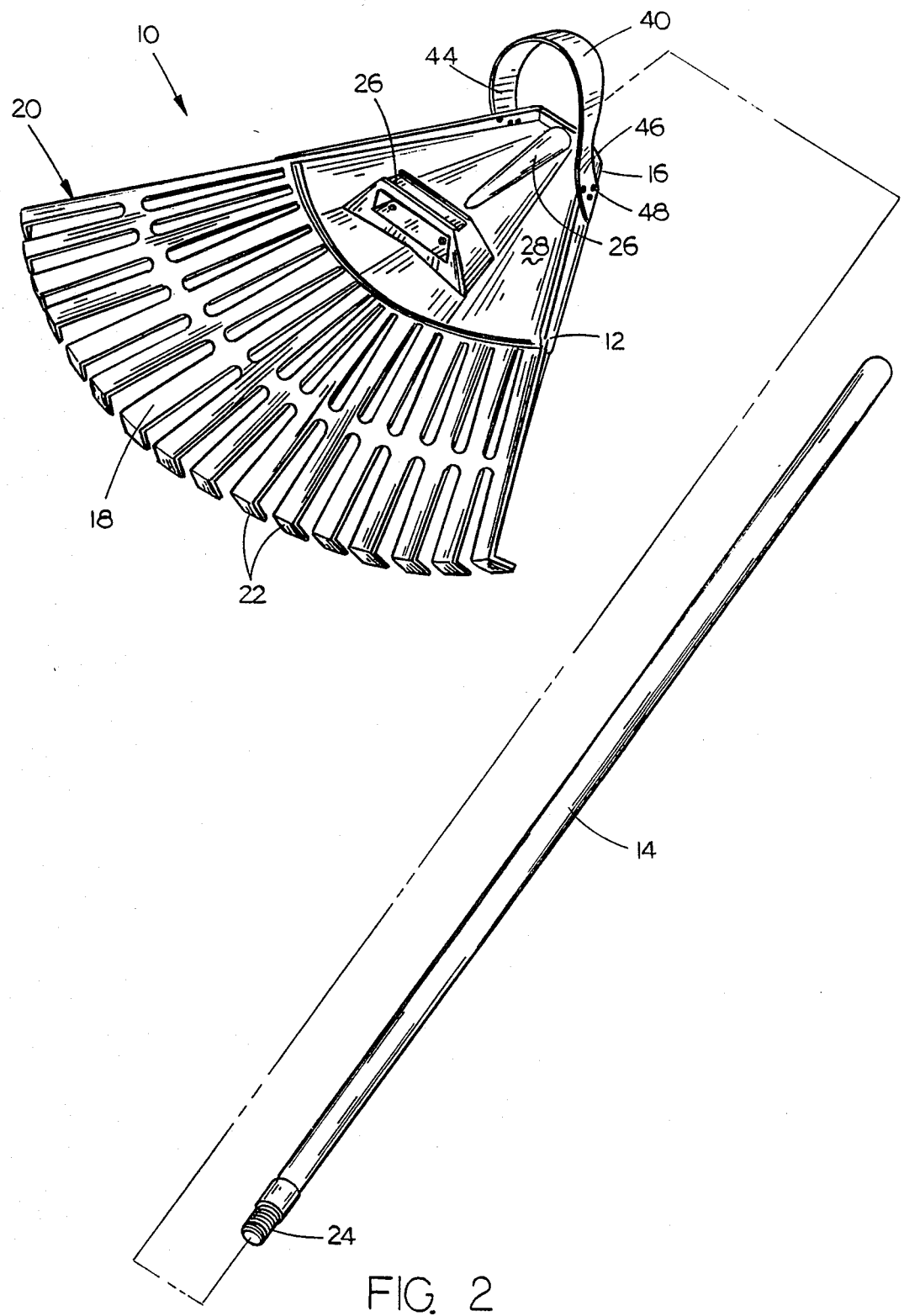
FIG. 2 is an exploded perspective view of the multipurpose rake of this invention.

Referring now to the drawings, in which identical or corresponding components are identified with the same reference character, and more particularly to FIG. 2, the improved rake of this invention is designated generally at 10 and includes a head portion 12 and an elongated handle 14 extending from one end 16 of head portion 12. Rake head 12 has a plurality of tines 18 disposed along one end 20 opposite end 16. Tines 18 have depending teeth 22 which will contact the ground and collect leaves or other material as desired.

Handle 14 is threaded at one end 24 and is received within a threaded socket 26 in end 16 of rake head 12. Although a threaded handle is disclosed, many other methods of removably attaching a handle 14 to rake head 12 are common and known in the art.

Figure 4:
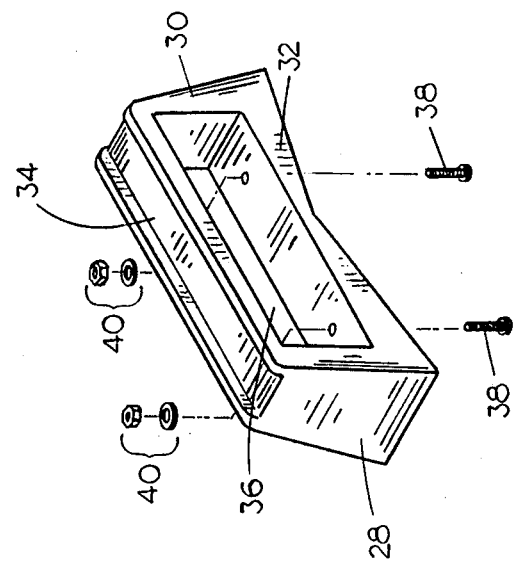
FIG. 4 is an exploded perspective view of the gripping handle of the invention.

A hand-hold 26 is affixed to rake head 12 intermediate tines 18 and end 16, on the upper face 28 of the rake head 12. Referring now to FIG. 4, hand-hold 26 includes a pair of spaced-apart upstanding ends 28 and 30 connected to a base 32, and having an upper cross bar 34 connecting the upper ends of upstanding ends 28 and 30. Thus, a generally rectangular opening 36 is formed. A pair of bolts 38 extend through base 32 and are fastened to rake head 12 with a washer and nut combination 40. The inventor anticipates that many other methods may be utilized to affix hand-hold 26 to rake head 12.

As shown in FIG. 2, a strap 40 is affixed to end 16 of rake head 12 so as to form a loop through which the user's arm may be extended. Each end 44 and 46 of strap 42 has a series of bolts 48 extending therethrough to affix strap 42 to rake head 12.

Figure 1:
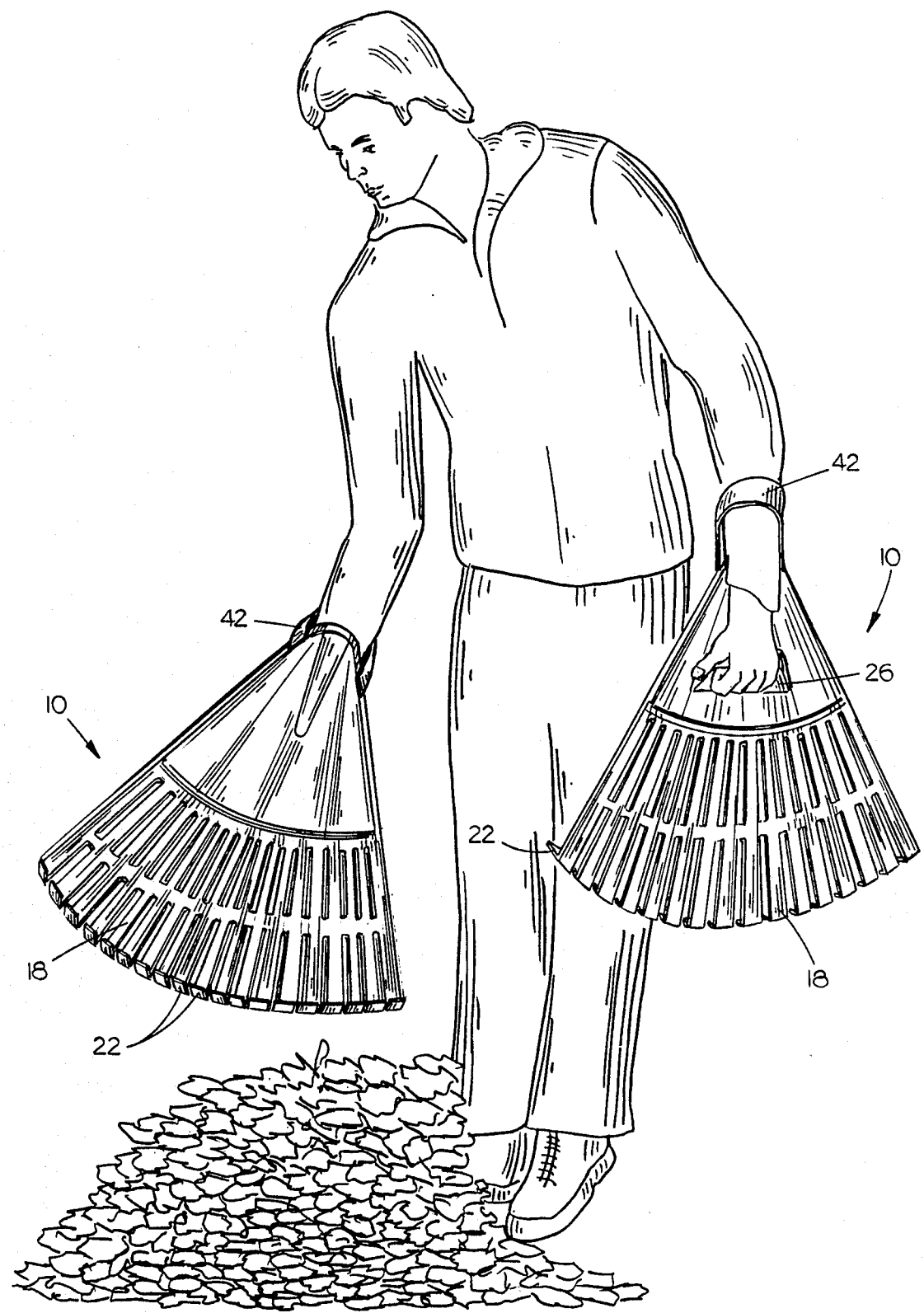
FIG. 1 is a perspective view of a person utilizing the multipurpose rake of this invention.
Figure 3:
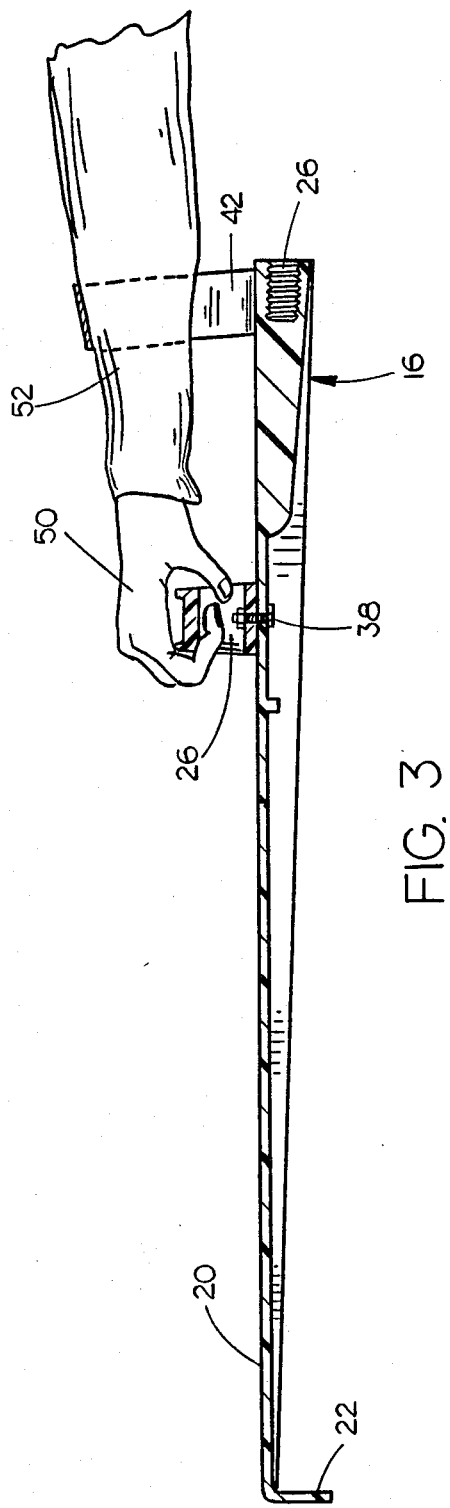
FIG. 3 is a cross-sectional view through the rake head of the invention.
Figure 5:
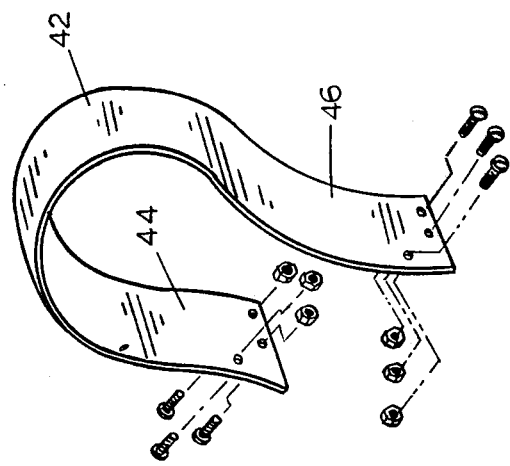
FIG. 5 is an exploded perspective view of the leverage strap of the invention.

In operation, it can be seen that rake 10 may be utilized as a conventional rake with handle 14 mounted to rake head 12. Once leaves or other material have been collected into a pile, handle 14 is removed from rake head 12, to allow use of the rake head in picking up and transporting the materials. The user extends a hand 50 through the loop in strap 42 to grasp hand-hold 26, with the user's forearm 52 within strap 42, as shown in FIG. 3. The combination of the strap around the forearm 52 with the grip on hand-hold 26 provides a large amount of leverage and control in lifting and maneuvering rake head 12. In this fashion, rake head 12 can be used as an enlarged extension of the user's arm and hand to lift and transport large amounts of leaves and other materials, as shown in FIG. 1.

Whereas the invention has been shown and described in connection with the preferred embodiment thereof, it will be understood that many modifications, substitutions and additions may be made which are within the intended broad scope of the appended claims. For example, handle 14 may be removably affixed to rake head 12 in a variety of manners which allow quick and easy connection and release of the handle to the rake head. Likewise, hand-hold 26 and strap 42 may be affixed to rake head 12 in a variety of different fashions, and could be molded as an integral part of the rake head itself.

It can therefore be seen that the present invention fulfills at least all of the above-stated objectives.

I claim:

1. In combination:

a rake having a head portion with a plurality of tines projecting therefrom and having an elongated handle removably connected to the head portion;

a hand-hold means formed integrally with said rake head, as one-piece structure, for a user to grasp to operate and maneuver the rake head; and strap means formed into a loop and mounted on said rake head spaced away from said hand-hold, to receive the forearm of a person grasping the hand-hold, whereby the rake head may be lifted and maneuvered when disengaged from the rake handle.

2. In combination:

a rake head having a plurality of tines along a first end and having means for receiving an elongated handle at a second end;

a hand-hold means formed integrally with said rake head, as a one-piece structure, for a user to grasp to operate and maneuver the rake head; and strap means formed into a loop and mounted on said rake head spaced away from said hand-hold, to receive the forearm of a person grasping the hand-hold, whereby the rake head may be lifted and maneuvered when disengaged from the rake handle.

3. In combination:

a rake having a head portion with a plurality of tines projecting therefrom and having an elongated handle removably connected to the head portion;

a hand-hold means on said rake head for a user to grasp to operate and maneuver the rake head;

said hand-hold means including a loop of rigid material mounted on an upper face of said rake head, the rigid loop formed in a shape which may be grasped by a hand; and strap means formed into a loop and mounted on said rake head spaced away from said hand-hold, to receive the forearm of a person grasping the hand-hold, whereby the rake head may be lifted and maneuvered when disengaged from the rake handle.

4. In combination:

a rake head having a plurality of tines along a first end and having means for receiving an elongated handle at a second end;

a hand-hold means on said rake head for a user to grasp to operate and maneuver the rake head;

said hand-hold means including a loop of rigid material mounted on an upper face of said rake had, the rigid loop formed in a shape which may be grasped by a hand; and strap means formed into a loop and mounted on said rake head spaced away from said hand-hold, to receive the forearm of a person grasping the hand-hold, whereby the rake head may be lifted and maneuvered when disengaged from the rake handle.

* * * * *